United States Patent [19]

Bone, Jr.

[11] Patent Number: 5,270,522
[45] Date of Patent: Dec. 14, 1993

[54] DYNAMIC BARCODE LABEL SYSTEM

[76] Inventor: Wilburn I. Bone, Jr., 8328 Harvard, Raytown, Mo. 64138

[21] Appl. No.: 728,296

[22] Filed: Jul. 11, 1991

Related U.S. Application Data

[63] Continuation-in-part of Ser. No. 552,254, Jul. 12, 1990, Pat. No. 5,171,976.

[51] Int. Cl.$^5$ .............................................. G06F 15/20
[52] U.S. Cl. .................................... 235/375; 235/472; 235/494
[58] Field of Search ..................... 235/1, 92, 375, 402, 235/494, 472

[56] References Cited

U.S. PATENT DOCUMENTS

| | | | |
|---|---|---|---|
| 3,470,357 | 9/1969 | Ritzerfeld | 235/494 |
| 3,629,559 | 12/1971 | Cassaday . | |
| 3,721,806 | 3/1973 | Stothart . | |
| 4,114,033 | 9/1978 | Okamoto | 235/494 |
| 4,204,639 | 5/1980 | Barber et al. | 235/462 |
| 4,531,051 | 7/1985 | Sagmuller . | |
| 4,667,293 | 5/1987 | Krieger et al. . | |
| 4,680,704 | 7/1987 | Konicek et al. . | |
| 4,746,932 | 5/1988 | Sato . | |
| 4,864,112 | 9/1989 | Imai et al. . | |
| 5,064,222 | 11/1991 | Legault . | |
| 5,083,816 | 1/1992 | Folga et al. . | |

OTHER PUBLICATIONS

Cyclometers, Leslie's Weekly, Apr. 21, 1900.
TMS, MS Brochure, Duncan Electric Co. Aug. 1, 1990.
Compumatic Brochure, Hexagram, Inc., 23905 Mercantile, Cleveland, Ohio 44122; (216)464-1057, pp. 4-6, 1984.
Hubodometer, Veeder-Root, 70 Sargeant St; Hartford, Conn. 06102; (203) 527-7201, 1985.
Catalog 10437, Veeder-Root, pp. 3, 6, 25, 1986.
USS-39; Aim, Inc., 1326 Freeport Rd; Pittsburg, Pa. 15238; 1986.
Code 39, Intermec Corp.; 4405 Russell Rd; Lynnwood, Wash. 98046-9702; (206) 348-2600, 1986.
MS Brochure, Landis & Gyr, Feb. 15, 1988.
PC-IRL, Intermec Corp; 1987.
ID Systems, C. Itoh Ad, vol. 7, No. 5, Jun. 1987.
ID Systems, Bar Code, Inc. Ad, vol. 7, No. 5, Jun. 1987.
Publication 25, U.S. Postal Service, Aug. 1988, p. 25.
Giant Step Brochure, Aim, Inc.; 1326 Freeport Rd; Pittsburg, Pa. 15238; 1988.
Itron Brochure, Itron, Inc.; 15616 Euclid; Spokane, Wash. 99215-5288, (509)924-9000; p. 4, 1989.
Auto ID, Distribution Magazine, Jun., 1990, pp. 66, 68, 70.
York Brochure, York Tape and Label Co., 1953 Stanton St York, Pa. 17404. Date unknown.

*Primary Examiner*—Harold Pitts
*Attorney, Agent, or Firm*—Litman, McMahon & Brown

[57] ABSTRACT

A dynamic barcode label system includes label base with a plurality of discrete preprinted barcode character media positioned thereon in side by side relation to form a single barcode indicia sequence. The label base includes a face wall with an elongated window formed therethrough and a rear or backing wall. The barcode character media comprise barcode character strips having a plurality of barcode indicia sets printed thereon and representing a plurality of respective characters. The character strips are slidably adjusted relative to the window to select the characters to be represented by the label. The character strips can be formed as endless barcode character bands supported on a character band support on the rear wall of the label base. In one embodiment of the present invention, the label base is sheet material and the barcode character media are adhesively backed barcode decals, each of which has printed thereon a barcode indicia set representing a single character or symbol. The barcode decals are adhered to the label base in side-by-side relation to form a single barcode indicia sequence.

15 Claims, 4 Drawing Sheets

DYNAMIC BARCODE LABEL SYSTEM

CROSS REFERENCE TO RELATED APPLICATION

This is a continuation-in-part of copending U.S. patent application Ser. No. 07/552,254 filed Jul. 12, 1990 for DYNAMIC CODED MECHANICAL METERING SYSTEM, which is now U.S. Pat. No. 5,171,976, Dec. 15, 1992.

FIELD OF THE INVENTION

The present invention relates to systems for counting and measuring operations and, more particularly, to a label device which incorporates dynamically variable barcodes.

BACKGROUND OF THE INVENTION

Since about the beginning of the twentieth century, utility companies have employed persons as meter readers to walk routes, visually read utility meters, and record the current readings. The raw data is transcribed by clerical workers in the utility customer accounts department, more currently by key entry into a data terminal of a customer billing computer, where the current reading for an account is compared with the previous reading to determine utility usage for the period. Any errors in reading the meter, recording the data, or transcribing the data results in costly inefficiencies in the billing procedure by overcharging or undercharging the customer which must then be corrected, often by a special service call to the customer's home or business. Utility companies have sought to increase the efficiency of meter reading and to reduce errors throughout the billing procedure.

In general, these problems are reduced by reducing the involvement of humans in the data communication chain from the meter to the billing computer. One of the problems associated with changing the billing procedures of a utility company is the large scale of the effort. A utility company in a large metropolitan area may have hundreds of thousands, even millions, of service connections and, likewise, meters. Thus, modifying or replacing the meters of a company can be very expensive, as well as complex and confusing during the s changeover period.

One class of approaches to solving these problems is remote meter reading. In one type of remote meter reading, each meter is provided with a small sensor or computer combined with a radio transponder which records utility usage and sends a code string identifying itself and conveying the usage data when interrogated by a compatible meter reading transponder unit on a utility truck which drives in the vicinity. A computer in the truck stores the data received from each meter interrogated for subsequent uploading to the utility billing computer.

One problem with radio linked metering is the expense of adding a meter sensor and radio transceiver to a great number of meters. Additionally, utility meters are often located outdoors, so that such a meter sensor and transceiver would have to be capable of operating precisely in extremes of temperature, moisture, and sunlight as well as protected from vandalism and animals. While such protection is within the capabilities of the state of the art of electronic devices, it would add further to the cost of implementing such a billing procedure.

Another remote metering approach which has been considered is interfacing a meter sensor to the utility billing computer by way of the customer's telephone line or television cable. Interrogation of the customer's meter generally occurs when the transmission line is not in use for its primary purpose to avoid possible interference, that is, when no call is in progress on a telephone line or when a television connected to the television cable is not in use.

Meter reading over existing communication lines requires the involvement of the telephone company or cable system for data gathering and transfer to the utility company. This adds a layer of complexity to the billing and the resolution of billing disputes. While most households have telephone connections, some do not have cable connections. If service to these facilities is interrupted by nonpayment of bills, weather, or accidental cutting of the service lines, billing is also interrupted. Thus, such an approach might require conventional meters as backup for such contingencies. Additionally, some customers might object to such a billing method on privacy grounds because of fears that their private activities are being surreptitiously monitored.

In addition to the practical problems of remote meter reading mentioned above, there are advantages to having utility personnel periodically visit each installation. This allows for at least a cursory inspection of the meter to note its condition, whether vandalism has occurred, or if a safety situation exists which warrants immediate repair, such as evidence of a gas leak around a gas meter.

Another class of improvements in utility billing procedures is based on increasing the efficiency and precision of readings taken by meter readers. These methods include portable data entry devices into which the meter reader enters the meter reading and other pertinent information by a keypad of the device for eventual uploading into the billing computer. Use of this type of device requires no modification of existing meters and allows an inspection of the premises of each installation, but has the possibility of error from miskeying of data. In another method, a sensor is interfaced to the meter and is interrogated through an infrared communication link by a portable data collector. This method is similar to and suffers from some of the same problems as remote radio linked meter reading but has the advantage of an on-site reading by a meter reader.

What is needed to improve utility meter reading is an approach which requires minimal modification to existing types of utility meters, which is rugged and inexpensive, and which incorporates the periodic personal presence of a meter reader at each installation but does not require the meter reader to transcribe or key in the usage date.

There are other areas of data transcription which benefit in speed, efficiency, and accuracy from minimizing human entry of such data. A common example is in the checkout of groceries and merchandise in stores which has, to a great extent, transitioned from entry of prices of goods by key punches to optical scanning of barcodes on the labels of such goods which identify the products. Such barcode scanning of merchandise not only records the amount of the purchase and sales tax, but additionally allows automatic inventory update for a store and may also provide statistical data on the movement of products at given times and locales.

Barcode marking and identification of various kinds are also used in a great many other applications in diverse industries. For example, railroads use barcodes to identify cars in switching yards to cooperate with automatic switching systems to assemble trains. In automated warehousing operations, which use robotic lift vehicles moving in three dimensional racks, barcodes may be used to identify loads to be stored, as well as storage locations for automatic control of the robotic lift vehicles.

In many uses of barcodes, particularly industrial uses, barcode labels must be of a large size and of high quality because of their use under rough conditions or harsh atmospheres and requirements for reliable readability. On the other hand, it is often necessary to change such barcode labels, depending on the current industrial activity. To meet these needs, either outside contractors must be engaged to print new labels and the old ones discarded, or a company requiring such labels must acquire its own equipment and staff for printing such barcode labels.

SUMMARY OF THE INVENTION

The present invention provides an improved utility meter reading system which overcomes many of the problems described above by providing apparatus and methods for reading utility meters which require a meter reader to personally visit each utility installation, which do not require human transcription or keying of meter readings, and which require only minimal and economical modification to existing types of utility meters.

The present invention includes a dynamically variable, optically readable display device, particularly, a barcode encoded odometer. In a utility meter reading application, a barcode odometer is mounted on a utility meter and engaged with a rotary drive member thereof to replace or supplement the numeric readout thereof. The meter is also, preferably, provided with a barcode label having the utility customer's account or meter number encoded thereon. The meter is read using a conventional barcode scanner which is used to read the meter label and the odometer to gather and store usage data associated with the meter. The data is subsequently uploaded to a utility accounting computer through a communications interface on the scanner unit for billing purposes.

The odometer may be mechanically similar to conventional types of odometers, also referred to as cyclometers, and may be of either the internal or external pinion type. It includes a plurality of number or indicating wheels rotatably positioned on a mounting shaft. Each wheel has an outer cylindrical surface which is divided circumferentially into a number of indicia regions or segments, such as ten, for example. On each wheel, optically readable barcode indicia are imprinted to represent a sequence of numeric values, such as from zero through nine. The number wheels are formed of a plastic of one color, and the barcode indicia are imprinted in a contrasting color, as by hot stamping in the manner in which conventional odometers have numerals imprinted thereon. The indicia regions may also have human readable numerals corresponding to the barcode indicia imprinted thereon. Any one of a number of barcodes may be used on the odometers of the present invention, and the code selected would depend on the size of the odometer, the distance range from which the odometer is to be scanned, intervening media such as glass or plastic windows through which the odometer will be scanned, and other factors.

The odometer has a rotary input member, such as a gear which has a diameter sized to calibrate the odometer to read out in selected units of utility usage, such as cubic feet of gas, kilowatt-hours of electrical power, or gallons of water. The odometer may be encased in a housing having a window aligned with the indicia regions to be read or mounted in a conventional type of utility meter housing which is provided with a similar type of window.

The odometer is read using a conventional type of barcode scanner unit which may incorporate a rotating mirror type of scanning mechanism or may include a light pen type of input device which is manually drawn across barcodes. Such scanner units are specialized computers which are programmable to recognize a desired barcode, convert a barcode string into data representing numeric and alphabetic characters, and store the data in addressable memory. A scanner unit for the present invention preferably includes a display, such as an LCD, to display the converted characters. The memory is of a capacity to store a considerable number of data strings. A communications interface, such as an RS-232 serial port, is usually provided for connection of the scanner unit to another computer, such as a utility customer accounts computer, for transferring the gathered data into the utility customers' account files.

Although the present invention is described with particular reference to utility meter reading, it is also applicable to other types of counting and measuring operations which make use of odometer types of counters, such as liquid flow including gasoline pumps, printing, packaging, food and beverage manufacturing, vending, production winding, textiles, material handling, and product manufacturing. In addition to applications in reading the utility meters of end-user customers, the present invention also has utility in other aspects of utility operations, such as in reading flow meters in water pumping substations, in water and sewage treatment facilities, and the like. Another use of the present invention is in fleet vehicle operations, as to read vehicle hubodometers on buses, trucks, taxicabs, and the like and acreage counters on agricultural equipment.

In addition to barcode odometers, the present invention includes other dynamic barcode devices. Electro-optical displays, such as liquid crystal displays (LCD's) and the like, can be formed with display elements in the form of barcode elements which can be selectively activated to display barcodes. Such electro-optical device may be driven by conventional digital counter circuits through code converter circuits similar in function and concept to seven segment display decoders and binary decimal code (BCD) decoder circuits. The present invention additionally contemplates dynamically variable mechanical barcode printers comprising a plurality of cylindrical print wheels, assembled in a manner similar to odometer number wheels on a common shaft, with barcode groups embossed in circumferential indicia regions about outer cylindrical surfaces of the print wheels. The print wheels may be sequenced by internal or external pinions in the manner of odometers or may be individually driven, as by individual gears engaging toothed peripheries of the print wheels. Such a dynamic barcode printer mechanism may be used to print barcodes on a receiving medium, as by impact through an inked ribbon.

The present invention is also directed to variable barcode labels. In general, the variable barcode labels of the present invention are formed by a label base with discrete barcode media applied thereto, each barcode medium having preprinted thereon a whole barcode indicia set which represents a character. The barcode indicia sequence of the variable barcode labels of the present invention is, in effect, assembled from preprinted barcode indicia sets, in contrast to the barcode indicia sequence of conventional barcode labels formed by concurrent printing of an entire barcode indicia sequence including a start character, a plurality of subject characters, and a stop character.

In a simplified embodiment of the present invention, a barcode label is formed by a substrate of sheet material, such as card stock or the like, on which are adhered in side-by-side relation barcode character decals, which are adhesively backed. Such a label preferably includes start and stop characters at opposite ends which combine with the subject characters to form a single barcode indicia sequence. The label thus formed may be laminated in clear sheet plastic to increase its durability.

In a preferred embodiment of the variable barcode label of the present invention, the label is formed by a plurality of barcode character strips or barcode media which are positioned in side-by-side relation between a face wall with a window and a rear or backing wall forming a label base or housing and adjusted linearly to select the characters to be displayed through the face wall window prior to assembly of the label housing. Each elongated barcode character strip has barcode indicia sets preprinted therealong, the indicia sets represent characters to be selected, such as the Arabic numerals 0-9. A front surface of the face wall has barcode indicia imprinted thereon at opposite ends of the window to represent start and stop characters.

The label housing is provided with character strip fixing structure to maintain the positions of the barcode character strips along the window and the angular orientation of the strips relative to the window. The character fixing structure includes lines of rectangular teeth positioned above and below the window which alternate between the face wall and the rear wall for intermeshing of the teeth. The teeth on a given wall are aligned across the window such that a given character strip is received between an adjacent set of teeth above and below the window to fix its position along the window and its angular orientation. A flat bead extends along the inner surface of the rear wall and is aligned with the window to press the character strip against the rear surface of the face wall in the area to flatten the portion of the strips exposed through the window and to position all exposed strip portions in the same plane.

In one variation of the variable barcode strip label, the barcode character strips are simple linear strips with which characters are selected by linear sliding of the strips. In another variation, the ends of the barcode strips are attached to form endless character strips or bands. For the endless character bands, the rear wall of the label housing is provided with a character band support which has the rectangular teeth and flat bead formed thereon and which includes a bridge portion spaced from the rear wall of the label housing. The endless character bands extend about the bridge portion of the character band support, and characters are selected by adjusting the character bands about the bridge.

In all embodiments of the variable barcode labels of the present invention, the barcode media are preferably provided with human readable characters in addition to the barcode indicia. In a preferred combination of barcode indicia and human readable characters, the barcode indicia is printed in a color which can be read by the barcode reader or scanner to be employed while the human readable symbol is overlayed on the barcode indicia and is printed in a color which is invisible to the barcode reader device to be employed.

OBJECTS OF THE INVENTION

The principal objects of the present invention are: to provide an improved system for counting and measuring operations; to provide such a system which greatly improves the accuracy and efficiency of such operations; to provide such a system which avoids the transcription of counts and measurements by humans; to provide apparatus for such a system including readout devices which incorporate dynamically variable indicia which are readable by instruments, particularly optical scanning instruments; to provide such apparatus including an odometer with optically readable barcode indicia formed on counting wheels thereof for reading by conventional barcode scanner units; to provide, additionally, dynamically variable barcode devices, such as barcode displaying liquid crystal displays (LCD's), print wheels, and the like; to provide such a system which is particularly well adapted for employment in the reading of utility meters; to provide an improved utility meter reading method in which a barcode odometer is installed on a utility meter, drivingly engaged with the drive mechanism thereof, and calibrated to indicate utility usage in optically readable barcode indicia for reading by a conventional barcode scanner unit to gather and store usage data for subsequent uploading to an accounting computer of a utility company; to provide such a system which is adaptable for other types of counting operations in which counts are recorded, such as on manufacturing machinery to record unit production and other operations which conventionally employ large numbers of odometer type numeric readouts to provide a dynamic barcode label system which allows convenient assembly of barcode labels having a barcode indicia sequence representing a selected set of characters; to provide such a system including a label base and a plurality of preprinted barcode indicia media which are assembled in side-by-side relation on the label base; to provide a simplified embodiment of such a system in which the label base is formed of sheet stock and the barcode media comprise individual barcode decals, each of which is adhesively backed and has a barcode indicia set representing a single character or symbol, the barcode decals being adhered in side-by-side relation on the label base to form a single barcode sequence thereon; to provide such a system in which the label base includes a face wall with a barcode display window formed therethrough, a rear or backing wall, and a plurality of barcode character strips which are slidably adjusted relative to the window to expose a selected group of barcode indicia sets representing a desired set of characters or symbols to be displayed; to provide an embodiment of such a system in which the ends of the barcode character strips are attached to form barcode character bands which extend about a character band support on the rear wall of the label base; to provide such a system which is capable of employing a great variety of existing barcodes; and to provide such a dynamic barcode label system which is economical to manufacture and implement, precise and efficient in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a dynamic coded mechanical metering device embodying the present invention in the form of a barcode encoded odometer. The barcode odometer 1 has the form of a conventional numeric odometer with numerals replaced by ordered sequences of barcode indicia groups 2. The barcode odometer 1 is particularly well adapted for use in a dynamic coded mechanical metering system 3 (FIG. 4) which, in an exemplary embodiment, is employed for reading utility meters 4. In the system 3, the odometer 1 is drivingly engaged to the utility meter 4 in such a manner as to read out utility usage units in a barcode sequence which is scanned by a barcode scanner unit 5 to gather utility usage data for eventual transfer to a utility host computer 6 for utility customer billing purposes.

Figures 1, 2, 3, 4:
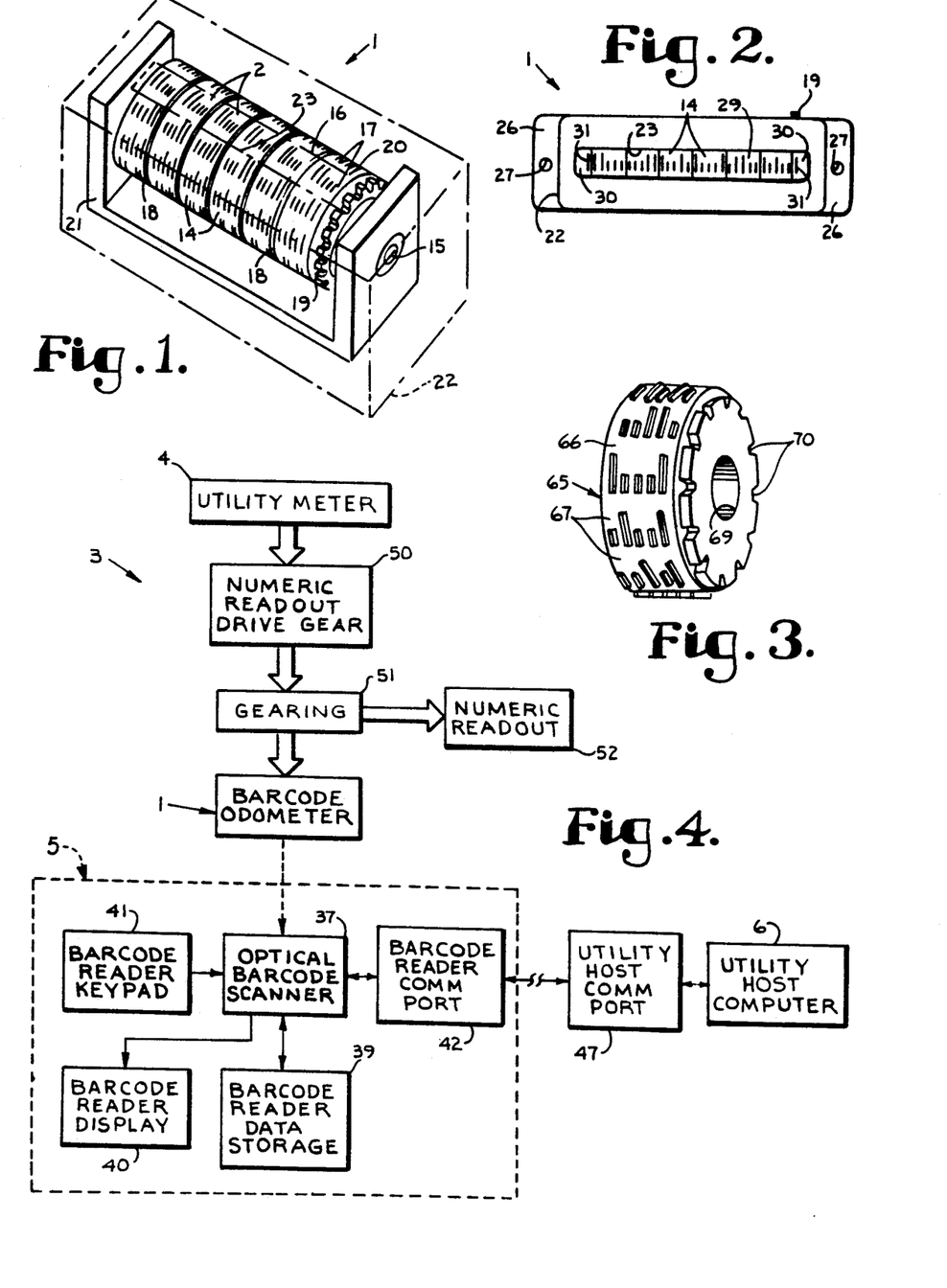
FIG. 1 is a perspective view of a barcode odometer for use in the dynamic coded mechanical metering system of the present invention.
FIG. 2 is a front elevational view of a barcode odometer, such as is illustrated in FIG. 1, shown enclosed in a housing with a scanning window formed therein.
FIG. 3 is an enlarged perspective view of a print wheel having barcode imprinting indicia embossed thereon.
FIG. 4 is a block diagram illustrating major functional blocks of a utility meter reading system of the present invention.

Referring to FIGS. 1 and 2, the barcode odometer 1 is structurally and mechanically identical to conventional numeric odometers, the principal difference being the barcode indicia groups 2 imprinted on indicator or number wheels 14 instead of numeric indicia. The illustrated odometer 1 includes a plurality of the indicator wheels 14 rotatably mounted on a mounting shaft 15. Each wheel 14 has an outer cylindrical surface 16 which is divided circumferentially into indicia regions or segments 17. Each of the indicia regions 17 has a barcode indicia group 2 imprinted thereon. Adjacent indicator wheels 14 are separated by partitions 18 which are rotationally fixed relative to the wheels 14 to avoid undesired transfers of rotation from one wheel to the next. Rotational inputs to the odometer 1 are made by way of a gear 19 affixed to a units wheel 20. The gear 19 is illustrated as externally toothed; however, it may also be internally toothed, depending on the configuration of the drive gear (not shown) which will be meshed therewith. The odometer 1 may be mounted in a frame 21 and enclosed in a housing 22 having a window 23 formed therethrough. The mounting shaft 15 is maintained rotationally stationary with respect to the wheels 14, as by being keyed or press fit to the frame 21, for the same reasons that the partitions 18 are kept stationary.

The illustrated odometer 1 is a decade odometer in which counting is based on the decimal number system;

however, the odometer 1 could also be based on another number system. The odometer 1 illustrated in FIG. 1 is an internal pinion odometer in which rotational numeric carries from one wheel 14 to the next are implemented by an internal pinion (not shown) engaged between adjacent wheels 14. The odometer 1 may alternatively be configured as an external pinion type in which the carry pinions are positioned external to the number wheels 14. Additional mechanical and functional details of odometers are not presented herein since such details are well known by manufacturers of odometers which have been in existence for numerous decades. The illustrated odometer 1 is classified as a non-reset type of odometer which is similar to automotive mileage odometers and which is suitable for applications such as in the utility meters 4 in which selective resetting is not desired. However, in some applications, reset type odometers, similar to automotive type "trip" odometers, may be desirable.

FIG. 2 illustrates the housing 22 in more detail. The housing 22 may be provided with mounting tabs 26 extending from opposite sides, as shown, or other mounting structure for mounting the odometer 1, as within a utility meter housing. The tabs 26 are shown with apertures 27 to receive mounting fasteners. The housing 22 includes a front plate or wall 28 which has the window 23 formed therethrough. The window 23 may have a transparent glass or plastic pane 29 positioned therein to restrict access to the indicator wheels 14. Many barcodes make use of some sort of start and stop code which are positioned at opposite ends of the barcode indicia string. Such start/stop codes are fixed in character, in contrast to the barcode indicia string displayed by the indicator wheels which varies according to the quantity counted. The odometer housing 22 illustrated in FIG. 2 is provided with masks or bezels 30 at opposite ends of the window 23 and having start and stop code indicia imprinted thereon. In the barcode shown in FIG. 2, each of the start and stop codes 31 comprises a single long stroke which is referred to as a frame bar. The bezel 30 may also have "quiet zones" of a selected length on outer side of the start/stop codes which is free from indicia or other marks, as is required by some barcodes.

Figure 6:
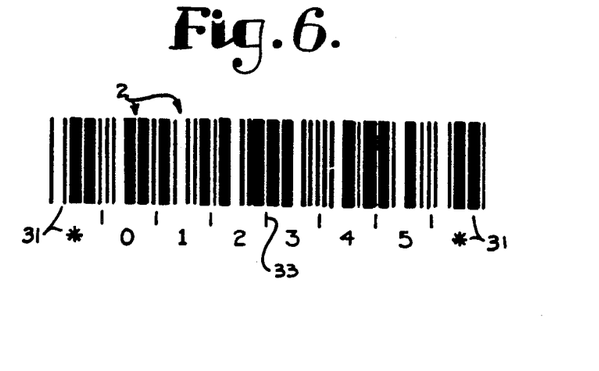
FIG. 6 is a barcode representation illustrating a portion of the Code 39 or "3 of 9" barcode which is capable of use in the present invention.
Figure 7:
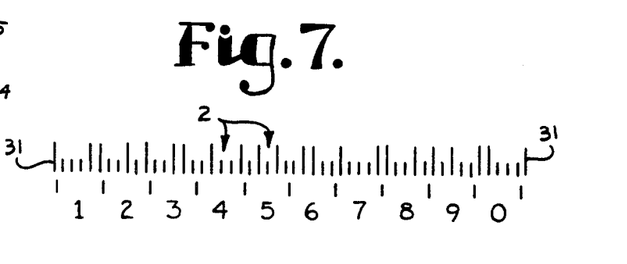
FIG. 7 is a barcode representation illustrating the POSTNET barcode which is capable of use in the present invention.

FIGS. 6 and 7 illustrate portions of two exemplary barcodes. There are a number of barcode schemes which would be appropriate for various applications of the present invention. FIG. 6 illustrates a portion of the USS-39 barcode which is also referred to as the Code 39 or "3-of-9" code. (USS refers to a Uniform Symbol Specification of the Automatic Identification Manufactures, Inc. or AIM of Pittsburgh, Pa.) The name of the USS-39 code is derived from code structure which includes three wide elements out of a total of nine elements. The nine code elements consist of five bars and four spaces. In FIG. 6, the barcode symbols represent the numerals 0-5 along with a start/stop character 31, represented by an asterisk or star. The barcode fields for each character in FIG. 6 are designated by separator lines 33, which are not normally present on a barcode label using this code, although the human readable characters represented by the barcode segments are often present. The USS-39 code is an alphanumeric code and is self-checking. Additional details and specifications of the USS-39 code can be obtained from AIM, Inc., referred to above, including acceptable spectral characteristics of the code elements FIG. 7 illustrates the POSTNET barcode which is used primarily by the U.S. Postal Service (USPS) to encode ZIP codes on letters for automatic sorting. Each POSTNET barcode indicia group consists of five bars, including long and short bars. The code is only used for the numeric characters 0-9. Each complete POSTNET barcode string includes frame bars on opposite ends which function as start/stop codes 31. Further details and specifications of the POSTNET barcode can be obtained from USPS Publication 25. In FIGS. 1-3 and 8, the illustrated barcodes therein are POSTNET codes for simplicity of drafting. However, in actual applications, other barcodes, such as USS-39, would probably be more suitable.

Additional barcodes in current use in various industries include barcodes known as: Interleaved 2-of-5, Codabar, Code 11, UPC/EAN also known as Universal Product Code, Code 128, and Code 93. Each code has characteristics which make it suitable for certain applications. Further information about these and other barcodes may be obtained from AIM, Inc., referenced above. The above described barcodes are referred to as linear barcodes which are read by a line scan. More recently, two dimensional symbologies have been developed which encode information in two dimensional arrays. Such techniques are capable of encoding far more information in a given unit of area than conventional barcodes. However, scanning such two dimensional codes is somewhat more complex than conventional barcodes, and usually involves devices such as charge coupled device (CCD) arrays. The present invention is not intended to be limited to the use of any particular barcode.

Figure 5:
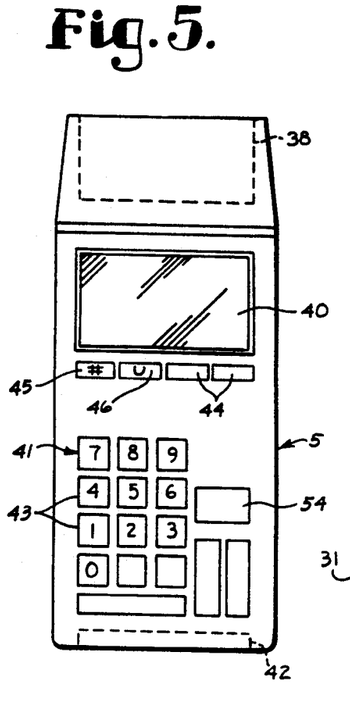
FIG. 5 is a top plan view representing a conventional barcode scanning unit for use in the system of the present invention with an optical scanning component and a communications interface indicated in phantom lines.

FIGS. 4 and 5 illustrate components of conventional type of barcode scanner units 5. The unit 5 is essentially a portable miniature computer which is programmed to perform the functions of scanning and reading barcodes, storing data representing characters represented by the barcodes, and communicating the data to other sources, such as another computer. The unit 5 includes a basic barcode scanner assembly 37 including a central processing unit (not shown) and an optical scanning mechanism 38 which is preferably of the rotating mirror type which is operative to scan a laser beam across a barcode to illuminate same and detect reflections therefrom. The detected reflections are digitized and decoded to data bytes which are stored in internal memory or storage 39. The laster may be in the visible spectrum or in the infrared spectrum. Infrared scanner units are used to read barcodes printed with carbon based inks and have the advantage of high immunity to smudges and scratches on a barcode label. The unit 5 may include a port for a barcode wand or light pen (not shown).

The illustrated barcode scanner or reader unit 5 includes an LCD display 40, a keypad 41, and a communications interface 42 (designated as a COMM port in FIG. 4). The characters read by the unit 5 may be echoed to the display 40, and function and error messages may also be displayed on the LCD 40. The keypad 41 includes numeric keys 43 and function keys 44. The numeric keys 43 may be used for entering data represented by a barcode, when human readable translations are displayed with the barcode symbols, if for some reason a particular barcode display cannot be successfully scanned by the scanner mechanism 38. The function keys are used for initiating selected functions of the scanner unit 5. In FIG. 5, an account number function key 45 is designated by a pound symbol, and a usage function key 46 designated by the letter "U" are illustrated. The account key 45 may be selected to cause the unit 5 to regard a scanned barcode as an account number of the utility meter read. Similarly, the usage key 46 may be selected to cause the unit 5 to store a scanned barcode as an actual meter reading.

The communications interface 42 is preferably a standard RS-232 serial port which allows the unit 5 to be connected to a compatible communications interface or serial port 47 of a host computer 6 to transfer data from the unit 5 to the computer 6. The communications interfaces 42 may alternatively be some other type of standard communications interface, such as RS-422, RS-485, or the like, or a proprietary type of communications interface. The scanner unit memory 39 may include read-only memory for storing operating programs for the unit 5 and read-write memory for storing operating data and sets of associated account numbers and meter readings. Scanner units 5 having memory capacities for storing thousands of readings are not uncommon.

Conventional utility meters 4 are driven by the media being metered, such as by gas or fluid flow for gas and water meters and electrical power for electric meters. The meters 4 include a rotary output member, such as a drive gear 50 which may be meshed with additional gearing 51 to calibrate a conventional utility meter numeric readout 52. Utility meters 4 typically have either pointer register readouts or odometer readouts, also referred to as cyclometer readouts. Pointer register type readouts include a plurality of what appear to be single handed clocks, each representing a digit of the current meter reading. Odometer type meters display the current meter reading directly in numerals.

Modification of a utility meter 4 having a pointer register type readout 52 for use in the present invention involves replacement of the pointer register unit with the barcode odometer 1 and providing the necessary gearing 51 to calibrate the odometer 1 to the meter 4. Modification of a meter 4 having a numeric odometer type readout 52 is much simpler in that the existing numeric odometer can simply be replaced by a barcode odometer 1 of the same size and type. In the present invention, it is desirable to have both a barcode display 1 and a human readable display of some sort. A newly designed utility meter 4 may be provided with two odometers, a barcode odometer 1 and a numeric odometer 52. Where a barcode odometer 1 simply replaces an existing numeric readout, it might be desirable to imprint numerals above or below the barcode indicia groups 2. Where the barcode odometers 1 are to be read using an infrared barcode scanner unit 5, the barcode indicia groups 2 may be provided with human readable characters similar to the OVERCODE (trademark) scheme of York Tape and Label Co. of York, Pa. In this scheme, human readable symbols are printed in red ink over the barcode symbols. The red ink is invisible to the infrared scanner units, but is readable visually.

Figures 8, 10:
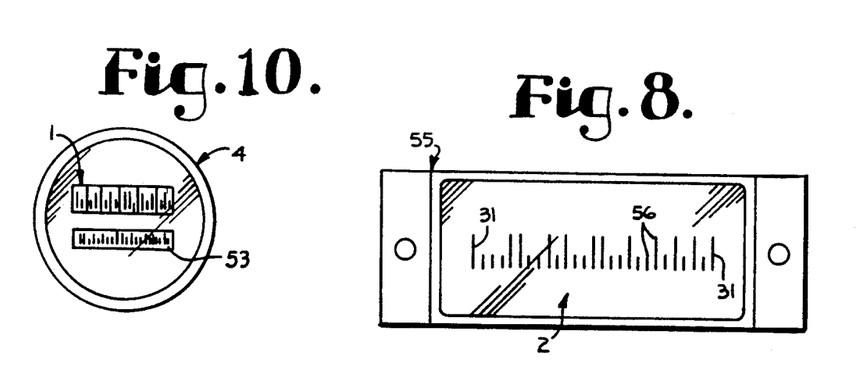
FIG. 8 is a front elevational view representing a barcode liquid crystal display (LCD) for use in the present invention.
FIG. 10 is a diagrammatic front elevational view of a utility meter equipped with a barcode odometer according to the present invention along with a barcode label identifying the meter.

FIG. 10 illustrates a utility meter 4 having a barcode odometer 1 installed therein. In a preferred method according to the present invention, a barcode label 53 is applied to the meter 4 to identify the particular meter 4 by a utility customer account number of a meter number or some other number associated with the account number. In performing a meter reading, the scanner unit 5 is used to scan the label 53, as by operating a scan key 54, placing the scanner unit 5 in a position for the scanning mechanism 38 to scan and read the label 53, then operating the account key 45 to store the read data as the account number. The scan and read operation is repeated to take the actual meter reading, except that the usage key 46 is operated to store the read data as the current meter reading. If for some reason either barcode is unreadable by the scanner unit 5, the required data can be entered using the numeric keypad 43 of the unit 5 if the odometer 1 and the label 53 are also provided with equivalent human readable symbols. When a number of meters 4 have been so read, the collected data may be uploaded to the utility host computer 6 using the communications interface 42 of the scanner unit 5, either directly or by some intervening medium such as by a modem (not shown), an intermediate computer (not shown), or the like.

Figure 9:
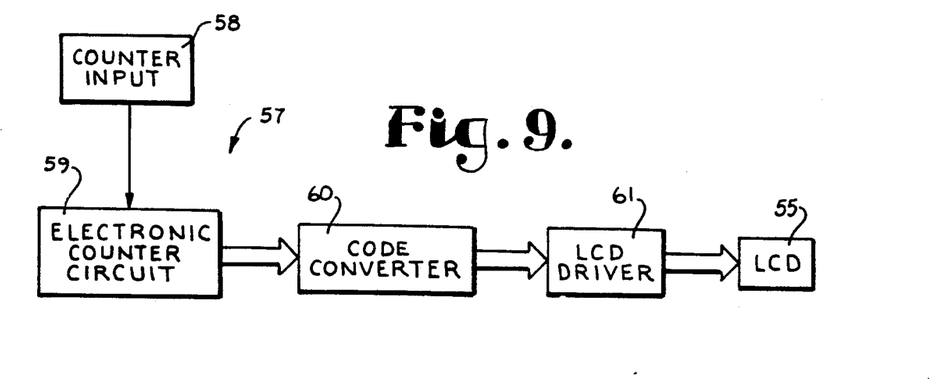
FIG. 9 is a block diagram illustrating principal functional blocks of driver circuitry for interfacing between an electronic counting device and the barcode LCD shown in FIG. 8.

FIGS. 8 and 9 illustrate an alternative electro-optical dynamic coded metering display in the form of a barcode liquid crystal display (LCD) 55. The barcode LCD 55 includes display elements 56 which are selectively activated electronically to display barcode indicia groups 2 representing numeric or alphabetic characters. The displayed barcode indicia 2 may then be scanned using a barcode scanner unit 5 to read the displayed code. The barcode LCD 55 is particularly useful on equipment in which counts and measurements are sensed electronically. Circuitry 57 for driving the barcode LCD 55 includes an electronic counter input 58 which provides count pulses, an electric counter circuit 59 which accumulates the pulses and outputs a binary code represent the accumulated count, code converter circuitry 60 which converts the binary code to a code suitable for activating the desired display elements 56, and LCD driver circuitry 61 which provides the proper voltage levers for activating the desired display elements. The converter circuitry 60 may be similar in some respects to the type of circuitry which is used to convert binary codes for activating seven segment numeric displays.

The illustrated display elements 56 form a POSTNET code for simplicity of illustration. If this code were employed, each display element would consist of a pair of vertically aligned bar shaped display subelements. To activate a long stroke, both subelements would be activated or only the lower subelement would be activated. Alternatively, other types of barcodes could be employed in which adjacent groups of display elements 56 would be activated to represent wide and narrow bars. The display 55 could also be adapted for displaying two dimensional barcode type symbologies, as described above. Although the electro-optical display 55 is described and illustrated as an LCD, illuminating type electro-optical displays, such as light emitting diodes (LED's), gas plasma displays, and the like could also be employed.

FIG. 3 illustrates a dynamic barcode print wheel 65 which may be similar in many respects to the indicator wheels 14 of the barcode odometer 1. The print wheel 65 has an outer cylindrical surface 66 divided circumferentially into indicia regions 67 in which mirror reversed barcode indicia groups 68 are embossed. A plurality of the print wheels 65 may be rotatably mounted in side by side relation on a mounting shaft (not shown) extending through central bores 69 to form a multiple dynamic barcode character printing device having a form similar to that of the barcode odometer 1. Such a printing device may be mounted in such a manner as to strike a receiving medium through an inked ribbon. The print wheels 65 may be rotationally positioned by driving gears or pawls engaging detents 70 formed about the periphery of the wheels 65. Alternatively, the print wheels 65 may have carry pinions (not shown) similar to odometer pinions and receive rotational inputs in the manner of odometers for serial barcode printing.

In the exemplary embodiments of the present invention disclosed above, optically readable dynamic barcodes and devices incorporating same have been described and illustrated. The present invention is not intended to be limited strictly to optically readable codes. The present invention also contemplates the incorporation in the apparatus and methods thereof of equivalent types of instrument readable indicia, such as magnetic characters and stripes, optically readable characters, and the like. The use of optical character recognition (OCR) is foreseen to have particular application in improved methods of utility meter reading. In such a method, the barcode scanner unit 5 would be replaced by a portable optical character scanner (not shown). It should be noted that a distinction between optically readable, implying readable by an optical instrument, and visually readable, implying readily human readable, is intended for most embodiments of the present invention, with the exception of optically recognizable characters which are both instrument and human readable.

Figure 11:
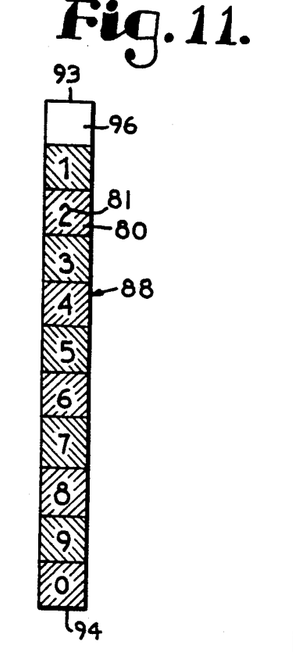
FIG. 11 is a front elevational view of a barcode character strip for use in variable barcode label devices embodying the present invention.
Figure 12:
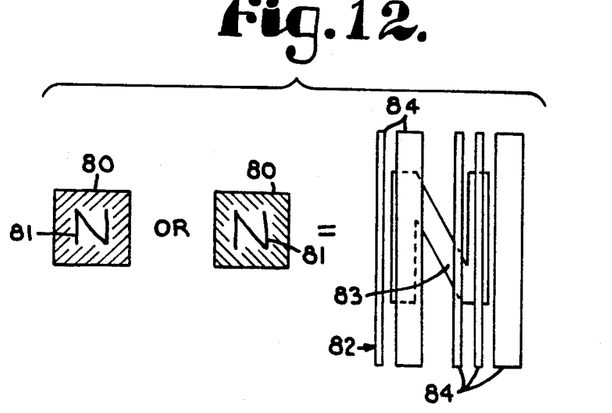
FIG. 12 is a diagrammatic view illustrating equivalence between symbols used in FIGS. 11, 13, 16, 18, and 19 and barcode indicia sets overlayed with human readable characters.

FIGS. 11-19 illustrate several embodiments of a dynamic or variable barcode label system according to the present invention. Referring to FIG. 12, the crosshatched squares 80 with the character "N" 81 therein are intended to represent a printed barcode indicia set 82 overlaying and representing a human readable character or symbol 83 which is also printed. The bars 84 comprising the barcode indicia set 82 are printed in a color which is readable by a barcode scanner unit, such as the unit 5 shown in FIG. 5, while the human readable symbol 83 is printed in a color which is invisible to the unit 5. Such a combination of barcode indicia and human readable symbols is similar to the OVERCODE scheme referred to herein above. The crosshatched squares 80 with symbols 81 are used in FIGS. 11, 14, 16, 18, and 19 to diagrammatically represent respective barcode indicia sets 82 with overlayed characters 83. Hereinbelow, barcode indicia sets will be referred to by reference numeral 80 and the characters or symbols represented thereby will be referred to by reference numeral 81. The barcode indicia sets 80 may be used in the barcode labels of the present with or without the characters 81 printed thereover, as is appropriate in the particular application in which the present invention is practiced.

FIG. 11 illustrates a barcode character strip 88 having a plurality of barcode indicia sets 80 preprinted thereon to represent characters or symbols 81, such as the Arabic numerals 1-9 and 0. The strips 88 are used in a variable barcode label device 90 illustrated in FIGS. 13-15 and a modified embodiment 91 of the variable barcode label device illustrated in FIGS. 16 and 17. In the device 90, the strips 88 have their opposite ends 93 and 94 connected to form an endless barcode character bands 95. The strip 88 may be formed with a blank area 96 at one end 93 for underlapping a similarly sized area at the opposite end 94 to form the barcode character band 95. The barcode character bands 88 are preferably formed of flexible sheet material.

Figure 13:
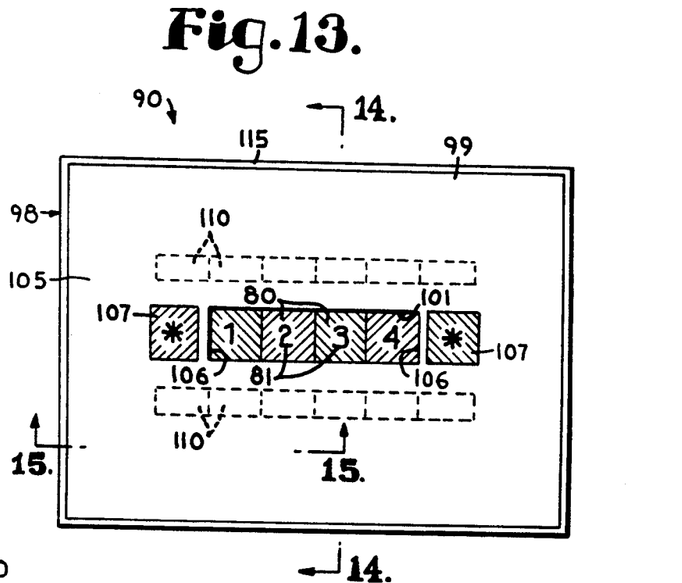
FIG. 13 is a front elevational view of a variable barcode label device embodying the present invention and incorporating endless barcode character bands.
Figure 14:
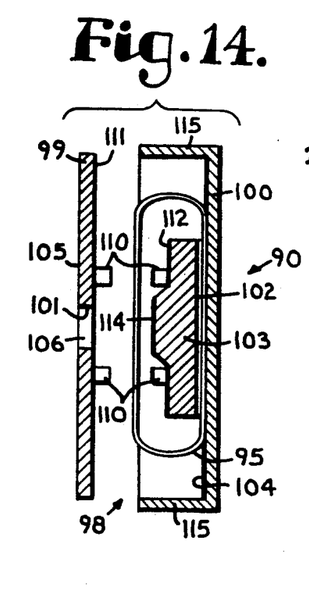
FIG. 14 is a cross sectional view taken on line 14—14 of FIG. 13 and illustrates details of the endless band barcode label device.
Figure 15:
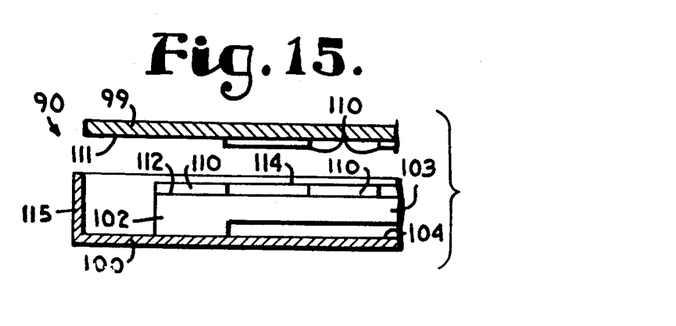
FIG. 15 is a fragmentary cross sectional view taken on line 15—15 of FIG. 13 and illustrates further details of the endless band barcode label device.

FIGS. 13-15 illustrate the variable or dynamic barcode label device 90 which employs the barcode character bands 95. The device 90 includes a label base or housing 98 formed by a face wall 99 and a rear or backing wall 100. The face wall 99 has a rectangular barcode display window 101 formed therethrough. A character band support structure 102 includes a bridge portion 103 which is spaced from the rear wall 100. The support structure 102 is affixed to an inner surface 104 of the rear wall 100 in general alignment with the window 101 of the front wall 99. The barcode character bands 95 are positioned in side-by-side relation on the bridge portion 103 of the support structure 102 and extend and are movable therearound. A front surface 105 of the face wall 99 has barcode indicia sets 80 and, if desired, symbols 81 to represent start and stop characters 107 printed adjacent opposite ends 106 of the window 101. The barcode character bands 95 are adjusted to expose the desired barcode indicia sets 80 through the window 101. The indicia sets 80 combine with the start and stop characters 107 to form a single barcode indicia sequence of the label device 90.

The variable barcode label device 90 includes structure for fixing the position and orientation of the barcode character bands 95 relative to the barcode display window 101. In the illustrated device 90, a pair of lines of spaced apart blocks or teeth 110 extend from an inner surface 111 of the face wall 99 and from forwardly facing surfaces 112 of the band support structure 102. The teeth 110 have the same length as the width of the bands 95 and are spaced apart a distance equal to the width of the bands 95. The teeth 110 are vertically aligned above and below the window 101 and are positioned in relatively alternating relation to mesh the teeth 110 on the face wall 99 between the teeth 110 on the support structure 102. The bands 95 are received between a pair of adjacent teeth 110 on either the face wall 99 or the support structure 102 and vertically aligned thereby (as viewed in FIG. 13) and prevented from being moved angularly with respect to the window 101.

The band support structure 102 is provided with a flat bead 114 which extends therealong and which presses the exposed portions of the barcode character bands 95 against the inner surface 111 of the face wall 99 in the area of the window 101 when the face and rear walls 99 and 100 are assembled. This flattens the exposed portions of the bands 95 and assures that all of the bands 95 are positioned in a common plane to increase the readability of the label device 90.

The label base or housing 98 may be formed of molded plastic material or of another type of material, such as card stock or the like. The thicknesses of the walls 99 and 100 are exaggerated in FIGS. 14 and 15, for graphic convenience. The rear wall 100 may include an edge wall 115 to close the housing 98. The label housing 98 may be assembled by snapping the face wall 99 into the edge wall 115 and secured, as by screws, ultrasonic welding, or other means. The variable barcode label device 90 may be is subsequently disassembled and the barcode character bands 95 adjusted to form a different barcode sequence, as desired by the ultimate user.

Figures 16, 17, 18, 19:
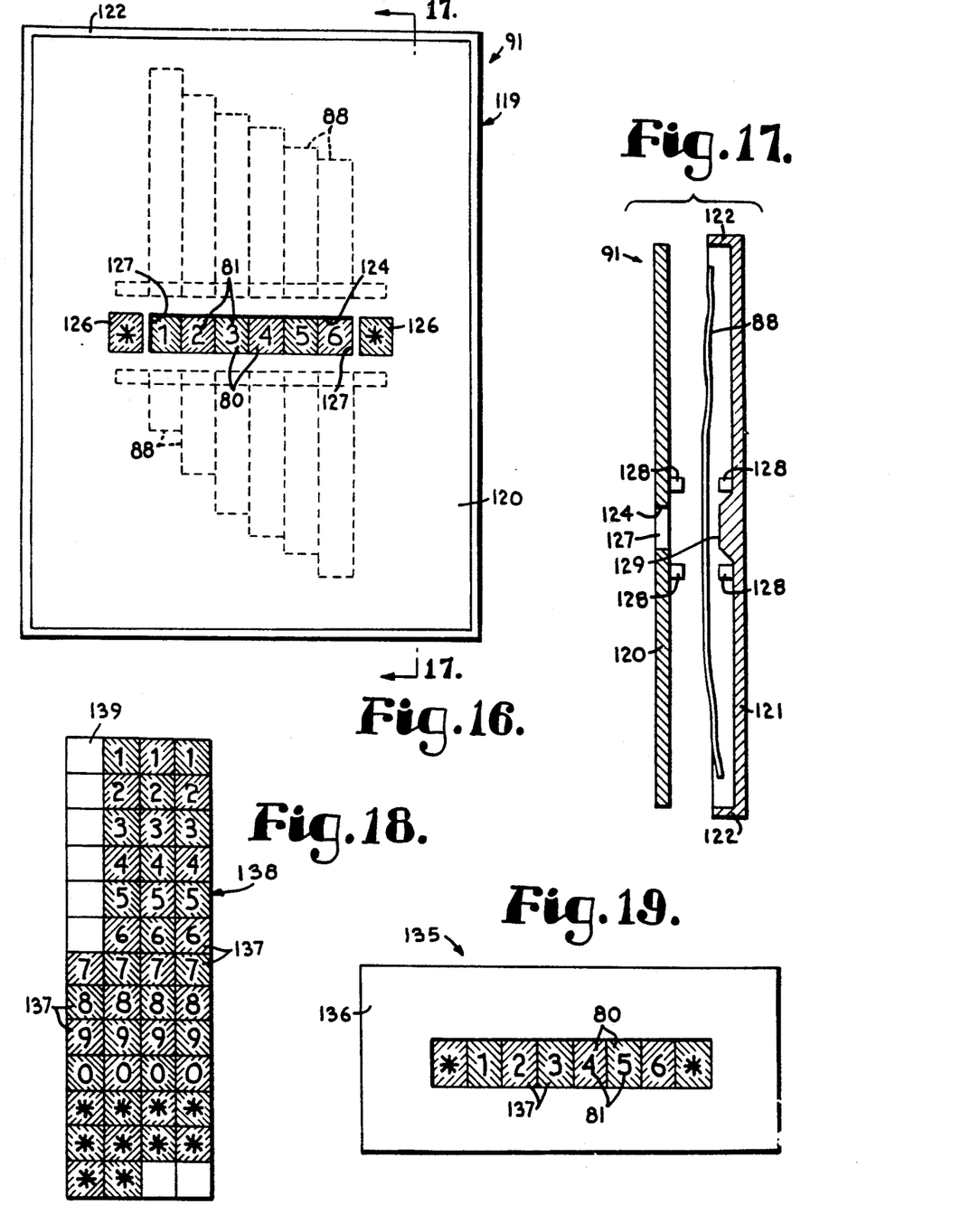
FIG. 16 is a front elevational view of a modified embodiment of the variable barcode label device according to the present invention which incorporates linear barcode character strips.
FIG. 17 is a cross sectional view taken on line 17—17 of FIG. 16 and illustrates details of the linear strip variable barcode label device.
FIG. 18 is a front elevational view of a sheet of adhesive backed barcode character decals for adhesive attachment to a substrate to form a stick-on variable barcode label device according to the present invention.
FIG. 19 is a front elevational view of a stick-on variable barcode label device according to the present invention which incorporates the adhesive backed barcode character decals of FIG. 18.

FIGS. 16 and 17 illustrate the variable barcode label device 91 which employs the linear barcode character strips 88. The device 91 is substantially similar to the device 90 but is simplified in some respects. The device 91 includes label base or housing 119 formed by a face wall 120 and a rear or backing wall 121 which may include an edge wall 122 to close the housing 119. The face wall 120 has a rectangular barcode display window 124 formed therethrough through which selected barcode indicia sets 80 printed on the barcode character strips 88 are exposed. On a front surface 125 of the face wall 120, barcode indicia sets 126 representing start and stop codes are printed at opposite ends 127 of the window 124 and form a single barcode indicia sequence with the barcode indicia sets 80 on the barcode character strips 88.

The front wall 120 and rear wall 121 are provided with blocks or teeth 128, similar in arrangement to the teeth 110 of the label device 90, to fix the lateral positions and angular orientations of the strips 88 relative to the window 124. A flat bead 129 extends across the rear wall 121 to press the selected portions of the character strips 88 flat against the window 124 and in a common plane. Barcode indicia sets 80 for the label device 91 are selected by simply sliding the character strips 88 relative to the window 124. The illustrated label device 91 is illustrated as being of a size to accommodate the full lengths of the barcode character strips 88. However, the housing 119 may alternatively be of a shorter vertical dimension and the excess portions of the strips 88 simply folded out of the way or cut away. In other respects, the variable barcode label device 91 is substantially similar to the variable barcode label device 90.

FIGS. 18 and 19 illustrate a simplified embodiment of the variable barcode label system of the present invention in the form of a stick-on variable barcode label device 135 (FIG. 19). The label 135 includes a label base 136 comprising a sheet of material, such as card stock or the like, with a plurality of barcode media in the form of individual preprinted barcode character decals 137 positioned thereon. The barcode decals 137 are adhesive backed are provided as a sheet 138 of an assortment of such decals 137 which are peeled off a backing sheet 139 and adhered to the label base 136. Each barcode decal 137 has imprinted thereon a barcode indicia set 80 which represents a single corresponding character 81. The decals 137 are positioned on the label base 136 in adjacent side-by-side relation and preferably include start and stop characters to form a single barcode indicia sequence. If desired, the barcode label 135 so constructed may be laminated between sheets of plastic (not shown) for increased durability.

It is to be understood that while certain forms of the present invention have been illustrated and described herein, it is not to be limited to the specific forms or arrangement of parts described and shown.

What is claimed and desired to be secured by Letters Patent is as follows:

1. A variable barcode device comprising:
 (a) a plurality of discrete code media, each code medium having thereon at least one indicia set having the form of an optically readable barcode indicia set which represents a respective alphanumeric character;
 (b) code display means positioning a plurality of said code media in close adjacent proximity such that the indicia sets on said media cooperate to define a single barcode indicia sequence;
 (c) code selection means cooperating with said code media and said code display means to enable selection of a plurality of said indicia sets to be displayed on said code display means to represent a corresponding plurality of alphanumeric characters;
 (d) said code display means forming a label base; and
 (e) each of said code media including an elongated barcode character strip of sheet material having a plurality of barcode indicia sets printed thereon which represent a plurality of alphanumeric characters.

2. A device as set forth in claim 1 wherein:
 (a) said label base includes a face wall having an elongated barcode window formed therethrough; and
 (b) said code selection means slidably positions said barcode character strip behind said face wall and enables sliding of said strip relative to said window to expose a selected barcode indicia set through said window.

3. A device as set forth in claim 2 and including:
 (a) barcode character strip fixing means to retain said strip in such a position to thereby expose said selected barcode indicia set through said window.

4. A device as set forth in claim 2 wherein:
 (a) said face wall has an optically readable barcode indicia set positioned at one end of said window and representing a start character;
 (b) said face wall has an optically readable barcode indicia set positioned at an opposite end of said window from said start code character and representing a stop character; and
 (c) said barcode indicia sets representing said start character and said stop character combine with said barcode indicia sets of said code media to form said single barcode indicia sequence.

5. A variable barcode label comprising:
 (a) a plurality of discrete code media, each code medium having thereon at least one indicia set having the form of an optically readable barcode indicia set which represents a respective alphanumeric character;
 (b) label base means positioning a plurality of said code media in close adjacent proximity such that the indicia sets on said media cooperate to define a single barcode indicia sequence;
 (c) code selection means cooperating with said code media and said label base means to enable selection of a plurality of said indicia sets to be displayed on said label base means to represent a corresponding plurality of alphanumeric characters;
 (d) each of said code media including an elongated barcode character strip of sheet material having a plurality of barcode indicia sets printed thereon which represent a plurality of alphanumeric characters;
 (e) said label base means including a face wall having an elongated barcode window formed therethrough; and
 (f) said code selection means slidably positioning said barcode character strip behind said face wall and enables sliding of said strip relative to said window to expose a selected barcode indicia set through said window.

6. A label as set forth in claim 5 wherein:
 (a) said face wall has an optically readable barcode indicia set positioned at one end of said window and representing a start character;
 (b) said face wall has an optically readable barcode indicia set positioned at an opposite end of said window from said start code character and representing a stop character; and
 (c) said barcode indicia sets representing said start character and said stop character combine with said barcode indicia sets of said code media to form said single barcode indicia sequence.

7. A label as set forth in claim 5 wherein:
(a) said barcode character strip has opposite ends which are connected to form an endless strip.

8. A label as set forth in claim 5 wherein:
(a) said label base means includes a rear wall normally positioned behind said face wall;
(b) said rear wall includes a barcode character strip support connected thereto and having a bridge portion thereof positioned in spaced relation to said rear wall; and
(c) said barcode character strip is positioned about said bridge portion of said strip support and has opposite ends which are connected to form an endless strip.

9. A label as set forth in claim 8 and including:
(a) barcode character strip fixing means to retain each barcode character strip in such a position to thereby expose said selected barcode indicia set through said window.

10. A label as set forth in claim 9 wherein said strip fixing means includes:
(a) a pair of pluralities of face teeth extending rearwardly from said face wall and positioned in mutual alignment respectively above and below said window and extending longitudinally therewith, adjacent face teeth being spaced apart to receive alternating barcode character strips therebetween;
(b) a pair of pluralities of rear teeth extending forwardly from said barcode character strip support and positioned in mutual alignment respectively above and below and area aligned with said window and extending longitudinally with said window, adjacent rear teeth being spaced apart to receive therebetween alternating barcode character strips not received between said face teeth, said rear teeth being positioned to mesh between said face teeth; and
(c) a flat bead extending along said strip support in alignment with said window, said bead pressing a portion of each barcode character strip having an indicia set to be exposed through said window toward an area of said face wall having said window formed therethrough.

11. A variable barcode label comprising:
(a) a plurality of elongated barcode character strips of sheet material having a plurality of barcode indicia sets printed thereon which represent a plurality of alphanumeric characters;
(b) label base means positioning a plurality of said barcode character strips in close adjacent proximity such that the indicia sets on said media cooperate to define a single barcode indicia sequence, said label base means including a face wall having an elongated barcode window formed therethrough and a rear wall normally positioned behind said face wall, said face wall and said rear wall being assembled in mutually overlaying relation;

(c) code selection means cooperating with said barcode character strips and said label base means to enable selection of a plurality of said indicia sets to be displayed on said label means to represent a corresponding plurality of alphanumeric characters, said code selection means slidably positioning said barcode character strip behind said face wall and enabling sliding of said strip relative to said window to expose a selected barcode indicia set through said window.

12. A label as set forth in claim 11 wherein:
(a) said face wall has an optically readable barcode indicia set positioned at one end of said window and representing a start character;
(b) said face wall has an optically readable barcode indicia set positioned at an opposite end of said window from said start code character and representing a stop character; and
(c) said barcode indicia sets representing said start character and said stop character combine with said barcode indicia sets of said code media to form said single barcode indicia sequence.

13. A label as set forth in claim 11 and including:
(a) barcode character strip fixing means to retain said strips in such a position to thereby expose said selected barcode indicia set through said window.

14. A label as set forth in claim 11 wherein:
(a) said rear wall includes a barcode character strip support connected thereto and having a bridge portion thereof positioned in spaced relation to said rear wall; and
(b) said barcode character strip is positioned about said bridge portion of said strip support and has opposite ends which are connected to form an endless strip.

15. A label as set forth in claim 14 and including
(a) a pair of pluralities of face teeth extending rearwardly from said face wall and positioned in mutual alignment respectively above and below said window and extending longitudinally therewith, adjacent face teeth being spaced apart to receive alternating barcode character strips therebetween;
(b) a pair of pluralities of rear teeth extending forwardly from said barcode character strip support and positioned in mutual alignment respectively above and below and area aligned with said window and extending longitudinally with said window, adjacent rear teeth being spaced apart to receive therebetween alternating barcode character strips not received between said face teeth, said rear teeth being positioned to mesh between said face teeth; and
(c) a flat bead extending along said strip support in alignment with said window, said bead pressing a portion of each barcode character strip having an indicia set to be exposed through said window toward an area of said face wall having said window formed herethrough.

* * * * *